Oct. 2, 1928.

G. W. HEATH 1,686,378

VARIABLE ELECTRIC CONDENSER

Filed May 3, 1924

INVENTOR
George W. Heath
BY
Warren S. Orton.
ATTORNEY

Patented Oct. 2, 1928.

1,686,378

UNITED STATES PATENT OFFICE.

GEORGE W. HEATH, OF NEWARK, NEW JERSEY.

VARIABLE ELECTRIC CONDENSER.

Application filed May 3, 1924. Serial No. 710,934.

The invention relates in general to variable electric condensers, such as are designed for use with high frequency current and radio apparatus, and the invention specifically relates to certain improvements in that type of condensers which include a set of stator plates and two sets of rotor plates, one of which is designed to coact with the stator plates to provide a major control of the capacitance and the other set of which is designed to provide a minor or micrometric variation in the capacitance.

More definitely defined the invention relates to the providing of means for facilitating the reading of the positions of the main and supplemental rotor plates relative to their associated stator plates and in this aspect of the disclosure the present application is to be regarded as a continuation in part of and companion case to applicant's copending application on variable condensers, filed October 11, 1922, Serial No. 593,726, now Patent No. 1,605,723, granted Nov. 2, 1926.

The primary object of the invention is to provide a simple and pleasing arrangement of the manually actuated controls for the main and supplemental rotor plates so that both sets of rotor plates may be easily and conveniently manipulated, either successively or simultaneously, and at the same time to provide such disposition of the indicators for each of the sets that the readings thereon will be readily visible to the operator while manipulating the controls.

Broadly, I attain this phase of the invention by utilizing the usual main dial knob for controlling the set of main rotor plates, by using a supplemental offset knob for controlling the supplemental rotor plate or plates, and to associate with the main dial knob, and preferably in the visible space above the same, an indicator for the supplemental rotor plate and to operatively connect the pointer of this indicator to the mechanism controlling the supplemental rotor plate so that the pointer will be moved in synchronism with the movement of the supplemental rotor plate.

Another object of the invention is to provide for an accurate setting of the supplemental rotor plate in predetermined relation to its associated stator plates.

I attain this phase of the invention by providing a coarse and therefore an easy reading scale for the supplemental rotor plate indicator and by providing a reducing driving connection between the control and the pointer for the scale so that a micromical movement of the supplemental rotor plate will cause a multiplied and relatively long movement of the pointer across its associated scale.

Further featuring the desideratum to provide easily read sets of indicators the invention contemplates the selection of contrasting colors for the several coacting dials and for the associated pointer and the organizing and associating of the several relatively movable and differently colored elements, so that the relation of one to the other may be readily determined at a glance by reading the dial at which the operator first glances and without necessity of careful attention.

Another object of the invention is to provide a rotor plate and control therefor which will be extremely sensitive to slight manual effort on the part of the operator when adjusting the same and in which the rotor plate and its associated pointer will be so balanced that they will remain set in whatever position they may be moved and will not automatically shift from their set positions.

Still another object of the invention is to provide an adjustable driving connection between the supplemental rotor plate and its associated indicator which connection will facilitate a ready re-setting of the driving parts between the rotor plate and its associated indicator so as to adjust the zero position of one relative to the other.

Various other objects and advantages of the invention will be in part obvious from an inspection of the accompanying drawings and in part will be more fully set forth in the following particular description of one form of mechanism embodying my invention, and the invention also consists in certain new and novel features of construction and combination of parts hereinafter set forth and claimed.

In the accompanying drawings:—

Figure 1:
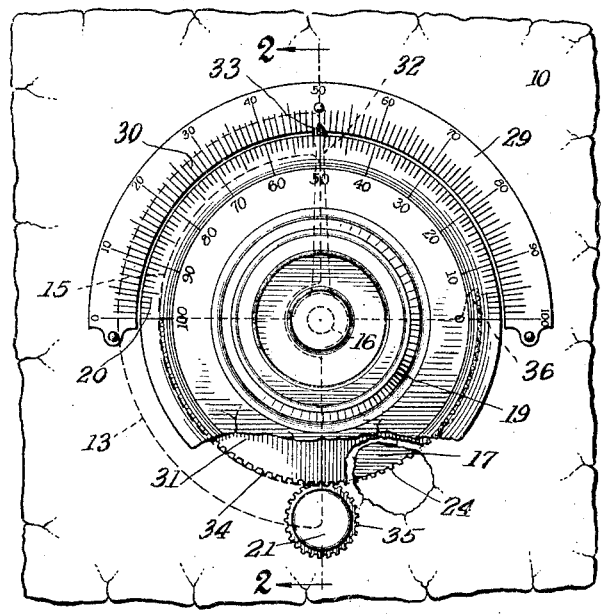
Figure 1 is a view in front elevation of a panel provided with a preferred embodiment of my invention and with parts broken away to show normally hidden details of construction.
Figure 4:
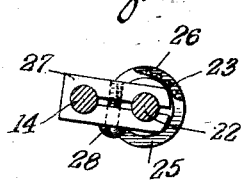
Figure 4 is a detail view of the supplemental control shaft mounting and taken on the line 4—4 of Figure 2.
Figure 2:
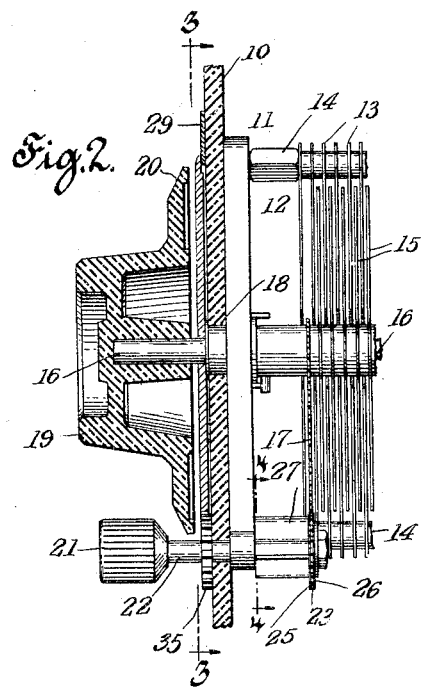
Figure 2 is a vertical sectional view taken axially through the main rotor shaft and taken on the line 2—2 looking in the direction indicated by the arrows.
Figure 3:
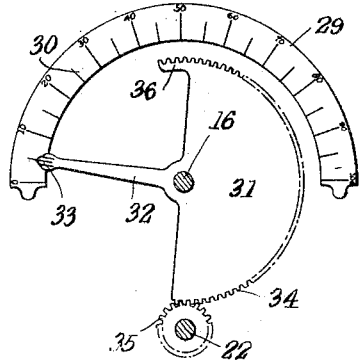
Figure 3 is a sectional view showing the supplemental indicator in front elevation and taken on the line 3—3 of Figure 2, looking in the direction of the arrows.

In the drawings there is shown a support 10, herein shown to be a panel board of a radio receiving set and on which is mounted a variable electric condenser 11. The condenser is a marketable unit and includes a frame 12 carrying a set of stator plates 13 secured by connecting rods 14 forming part of the frame. Interleaved between the stator plates are two sets of rotor plates, one set 15 constituting the main rotor plates which are fixed to a centrally disposed control shaft 16 and disposed to rotate about the axis of this shaft. The other set of rotor plates, herein shown to be a single plate 17, is loosely mounted upon the shaft 16 so as to be supported thereon for rotary movement about said axis and independently of the main rotor plates. The main shaft 16 extends forwardly of the frame 12 and projects through an opening 18 in the mounting panel 10. The main shaft is provided at its front end with a main rotor plate control or dial knob 19. One-half of the periphery of this knob is provided with a scale 20 extending 180° about the periphery of the dial knob, and marked in equally spaced and radially extending graduations numbered anti-clockwise from 0 to 100, all as is usual in such constructions. Still following conventional practice the dial knob illustrated is formed of a black composition with the scale graduations and numerals marked in fine and contrasting white lines.

The rotary plate 17 is controlled from a second knob 21 hereinafter referred to as a supplemental rotor plate control or knob, secured to the forward end of a supplemental control shaft 22 journalled in the support. This shaft is provided at its rear end with a pinion 23 which meshes with a segmental rack 24 formed on the periphery of the supplemental rotor plate as is more fully described in my above identified co-pending application. The pinion 23 is provided on opposite faces with disks 25 and 26 which project beyond the periphery of the pinion teeth and thus provide an annular guiding channel for receiving the teeth of the rack 24. The shaft 22 is mounted in the split end of a journal block 27 rotatably mounted on one of the frame rods 14. The bifurcations of the block are secured in position frictionally engaging the rod 14 by binding screw 28. Whenever it is desired to reset the pinion 23 to engage the rack 24 at a different place thereon the screw 28 is loosened, the block swung to disengage the pinion from the rack, the shaft 22 is rotated to bring the scale pointer hereinafter described into the desired zero position and the pinion is reset into meshing engagement with the rack. It is of course possible to reset the position of the supplemental rotor plate relative to its associated stator plates when the rotor plate is disengaged from the pinion. It is even possible to spring the pinion 23 away from the rotor plate 17 when the shaft 22 is journalled in the panel but any setting of the supplemental rotor plate relative to its indicator will usually be made before the condenser is mounted in place, or the adjustment may more easily be made by varying the relation of the indicator driving mechanism hereinafter described.

Positioned above the main dial knob is a narrow strip 29 hereinafter called a dial and forming part of the supplemental or vernier indicator. This dial is provided with a scale 30 arched 180° about the top of the main knob, concentrically disposed relative to the axis of the main shaft 16 and with the graduations spaced relatively great distances apart so as to form a coarse and easily read scale. The scale is graduated with radially extending lines designed to form extensions of the corresponding lines on the main scale 20 and are numbered clockwise from 0 to 100 in opposition to the corresponding numbering on the main dial. The dial 29 is formed of white composition so as to contrast vividly with the black central knob and the lines and numerals thereon are black so as to show up clearly on the white background. It has been found that this black and white combination is not only pleasing to the eye but has the mechanical advantage in that the eye quickly detects the relative position of the black and white indications. Further some people can read the white scale more readily than the black scale while others read the black scale more readily and in each case the shifting of the eyes from the black to the white scale tends to rest the eye and minimize eye strain.

The supplemental control knob 21 is positioned directly below the main knob and the parts are so disposed that the operator can adjust the main dial as usual and can manipulate the supplement knob from a position below the main knob and in this way the operator's hands while engaging either or both knobs do not interfere but permit both dials to be visible. The supplemental or vernier indicator is provided with a pointer 31 loosely journalled on the forwardly extending portion of the main shaft in rear of the main knob. The pointer includes a finger 32 mounted for movement across the so-called vernier scale 30 with a wide sweeping movement. The extreme end of the finger element of the pointer is provided with three radially extending lines 33 which assist the eye in locating the pointer relative to the graduations on the scale 30. In order to assist further in a quick sighting of these lines and in order to distinguish from both the white graduations on the knob and the black graduations on the fixed dial, these lines are of some contrasting color such as a bright red. As the pointer is positioned in rear of the knob and in advance of the dial only the extreme red marked end of the pointer is visible but this is sufficient for ready observation and insures the close locating of the fixed and movable dials. The portion of the pointer from which the finger extends is semi-circular resembling the rotor plate 17 and has its edge formed into a circular rack 34 in mesh with a pinion 35 fixed to the supplemental control shaft 22 in advance of the panel board. Like the supplemental plate the pointer is provided with an extension 36 from one end of its periphery to insure the meshing of the pinion with the pointer while providing for a rotary movement of at least 180°. This pinion and rack connection provides a reducing gear drive between the supplemental shaft and the pointer so that a relatively slight, mircromical movement of the rotor plate will be multiplied at the pointer and thus cause a relatively large movement of the pointer across its associated scale.

In operation and assuming that the rotor plates are properly located relative to their associated indicators and relative to their associated stator plates, the two control knobs may be actuated following conventional practices usually by a quick and relative rough adjustment of the main rotor plate and then by a more cautious adjustment of the supplemental or so-called vernier rotor plate. Usually the operator will turn the main dial with one hand and will turn the other dial with the other hand but both hands will be disposed out of the line of vision as the operator watches the dials and pointer. With the coacting differently colored dials herein featured it has been found that the main rotor plates as well as the supplemental rotor plate or plates can be swung repeatedly and exactly into any desired predetermined position and this has been found to be particularly desirable in radio receiving instruments where it is desired quickly to pick up some particular sending station, the dial readings of which have been previously determined.

In general an improved and highly sensitive accuracy is attained in obtaining repeatedly some predetermined capacitance of condensers equipped with the indicators herein featured. The arrangement is compact so that numerous units may be arranged within a small space on the panel and a neat, and pleasing showing is made.

Having thus described my invention, I claim:

Radio apparatus including a support, two mechanism controlling shafts comprising a main shaft and a secondary shaft eccentrically disposed and offset from each other, and both journalled in the support, a knob on the main shaft provided adjacent its periphery with a main dial, means secured to the support and providing a second dial disposed concentrically of the main shaft and exposed at the periphery of the main dial, a pointer journalled on the main shaft, positioned between the support and the main knob and having its end exposed exteriorally of the main knob and movable across the second dial to coact therewith, a secondary knob exposed adjacent the periphery of the main knob and secured to the secondary shaft and a driving connection between the secondary shaft and said pointer.

Signed at Newark, in the county of Essex and State of New Jersey, this 30th day of April, A. D. 1924.

GEORGE W. HEATH.